March 2 1943. B. J. FOY 2,312,893
TRIPOD CONSTRUCTION
Filed March 19, 1941
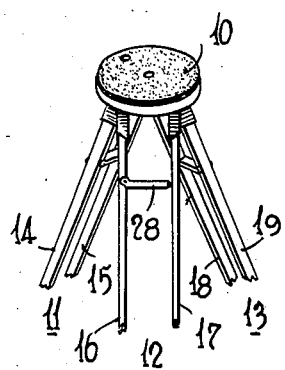
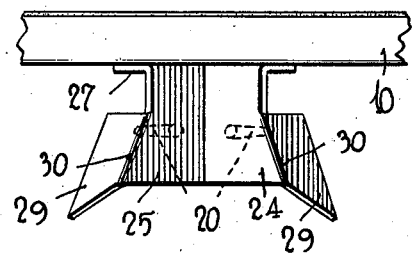
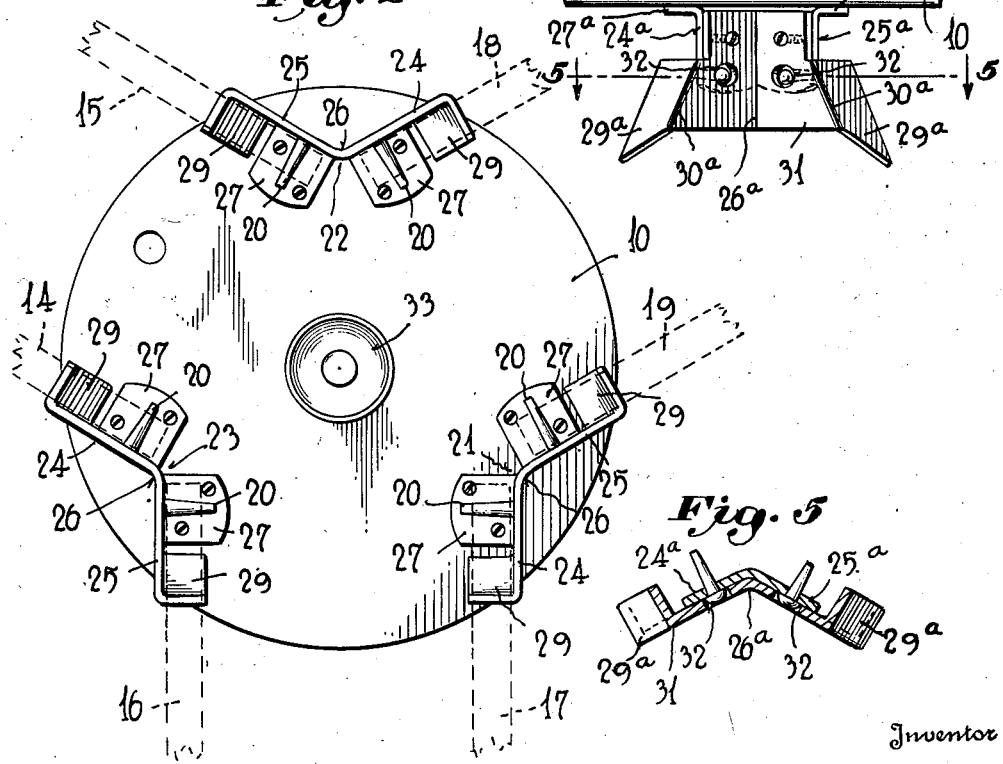
Inventor
Bernard J. Foy
By Dyre & Kirchner
Attorneys Patented Mar. 2, 1943

2,312,893

UNITED STATES PATENT OFFICE 2,312,893

TRIPOD CONSTRUCTION

Bernard J. Foy, Washington, D. C., assignor of one-half to Anthony Ludwig, Washington, D. C.

Application March 19, 1941, Serial No. 384,171

4 Claims. (Cl. 248—188)

My invention relates to tripods and analogous supports for cameras and other instruments and more particularly provides means for limiting the angular spread of the legs of the structure.

In the use of the ordinary tripod difficulty and annoyance are frequently experienced in setting up the structure and in maintaining it set up, by reason of slipping of the legs and consequent collapse of the tripod parts. The present invention remedies this difficulty by incorporating in a tripod of otherwise conventional construction a device for positively limiting the extent to which the legs may spread angularly from the table when the structure is set up. The device is so formed as to limit the several legs to a single, uniform angular relationship with the table, to which all the legs can be immediately and simultaneously swung, from which it results that the table will be disposed in an accurately true horizontal plane when the legs are fully spread to the limit imposed by the device, assuming of course that the legs are of uniform length and that the floor or ground on which the structure is set up is level. It follows that use of the device spares the operator the necessity of checking and adjusting angular relation of each individual leg to the table.

A further advantage of the device resides in its capacity to prevent increase of the angular relation of any leg beyond a predetermined maximum, so that the structure cannot collapse.

Other advantages are the extreme simplicity of the device, its small cost of manufacture, the fact that it occupies a negligible amount of space, the fact that it requires no adjustment but is always in operative condition, its rugged and practically indestructible character, and the facts that it is entirely foolproof in operation and is practically incapable of being abused to cause damage to itself or to the tripod structure or parts.

The device may be made as an integral part of the bracket which connects a tripod leg to the table, or in a slightly modified form it may be made as an attachment to be applied to a conventional type of tripod structure already in existence.

Both forms of the invention are illustrated in the accompanying drawing which forms part of this application for Letters Patent and in which Figure 1 is a perspective view, on a relatively reduced scale, of the upper portion of a tripod structure embodying the invention;

Fig. 2 is a bottom plan view, on a relatively enlarged scale, of the tripod table, showing portions of the legs in broken lines;

Fig. 3 is a side elevational view, in upright position, of one form of bracket embodying the invention;

Fig. 4 is a similar view of a modified form of bracket embodying the invention; and Fig. 5 is a cross-sectional view taken along the line 5—5 of Fig. 4.

Referring to the drawing, the tripod structure in which the invention is embodied is one which includes a table 10 and three legs 11, 12 and 13. Each leg is preferably made of wood, although of course any other suitable material may be used, and comprises a pair of stick elements. In order to clarify the relationship of the leg parts to the brackets in the several views of the drawing, the stick elements of leg 11 are designated 14 and 15, those of leg 12 are designated 16 and 17, and those of leg 13 are designated 18 and 19. Each pair of stick elements of each leg may have lower telescopically related portions (not shown) by which the effective length of each leg may be adjusted to vary the height of the table, or to compensate for a slope in the floor or ground, or to tilt the table, all in a well understood manner.

The extreme upper end portion of each stick element is perforated laterally so that it may be journalled on a pintle carried by the under side of the table, spaced somewhat below the table, and extending in a plane which is approximately parallel to that of the table. In the type of construction shown, these pintles are provided in the form of pins 20 projecting right angularly from brackets 21, 22 and 23 which depend from the table.

Each of these brackets conveniently comprises a metal plate divided into two angularly related portions 24 and 25 by a central vertex line 26. Each of the two angular portions is provided at its upper edge with a right angularly turned ear 27 which is screwed or otherwise made fast on the under side of the table.

From the foregoing explanation, taken in conjunction with the showing in Fig. 2, it will be observed that if the three brackets are arranged equidistantly about the marginal zone of the under surface of the table, and if the plate portions 24 and 25 of each bracket form with each other an angle of approximately 120°, each of the two pins 20 of each bracket will be aligned with and spaced from the opposite pin of the next adjacent bracket, so that the pins of such two brackets lie on a line which may serve as a turning axis for a leg. To connect such leg to the two aligned pins it is only necessary to bend the two stick elements together and then expand them apart to seat the pins in the perforations which, it will be recalled, are provided in the extreme upper end portion of each stick element. This operation is readily performed because each stick element is inherently quite flexible between its upper end and its lower jointed connection with the cooperating telescoping part (not shown) of the leg. When the stick elements are expanded on to the pins they are maintained in such position by a small bridge member 28 which is hinged at one end to one stick element of each leg and is swung to the position shown in Fig. 1 to contact, or almost contact, the other element of the leg and prevent accidental inward flexing of the stick elements and consequent disconnection of the leg from the brackets.

It will be recognized that each bracket contributes to the support of two legs, since it mounts one stick element of each of two legs. Thus, for example, the leg 12 has its stick element 16 engaged with the pin of bracket 23 and its stick element 17 engaged with the pin of bracket 21.

It is apparent that if the structure consisted solely of the parts thus far described, each leg would be able to swing outwardly into parallelism with the table. As heretofore explained, a primary object of the invention is concerned with limiting the extent to which each leg can be swung, and this is accomplished by the means which will now be described.

At the free edge of each plate portion 24, 25, I provide an integral, right-angularly turned ear 29. Since the side face of each plate portion parallels the path through which the adjacent stick element of the leg moves, the two ears 29 of the two brackets which cooperate with each leg lie directly across that path and constitute a stop for limiting the extreme outwardly spread position which the leg can assume. Thus, in Fig. 2 the ears 29 of brackets 21 and 23 are shown engaging and stopping stick elements 16 and 17 of leg 12.

The ears 29 are all identical in shape. In order to provide a substantial area of ear surface for engagement with the adjacent stick element, each ear is extended lengthwise as well as laterally, and joins the free edge of the bracket plate portion along a sloping line 30. That is to say, the free edge 30 of each plate portion makes the same angle with the vertical plane of the table as the angle to which it is desired to limit the outspread leg. It will be manifest that with such construction the opposite, aligned ears 29 of each pair cooperate to provide a sort of skeletonized pocket or trough that will present a very appreciable area to become engaged by the intervening leg when spread outwardly so that the angle of spread will be effectively limited.

All the ears slope at the same angle with relation to the table plane, so that the maximum spread position is the same for all the legs. In use, therefore, if the floor or ground is level and all the legs are of the same length, it is only necessary to swing all the legs out into abutting relation with the respective ears 29 and the table will be found to be accurately level and the tripod securely maintained against possibility of collapse.

The foregoing construction requires a specially made bracket unit, since different parts of the same integral plate serve to mount the pintle pins and to function as the ears 29. In Figs. 4 and 5 I show a slightly modified construction in which such two parts of each bracket are separate, so that the part providing the leg-limiting ear can be attached to the pintle pin bearing plate of a bracket already made. In this modification 24a and 25a designate the plate portions of a bracket secured to table 10 by ear portions 27a and terminating just below the usual pintle pins. Screwed or otherwise affixed to the outer side of the pair of plate portions is an auxiliary plate 31 having a central body area divided along its median line 26a into two 120° related portions which are bounded by sloping free edge lines 30a from which project leg limiting ears 29a, all in the manner of the corresponding parts of the first described embodiment of the invention. The object of course is to provide a two-element counterpart of the integral bracket element of Figs. 2 and 3 that will perform identical functions.

Holes or pockets 32 are best provided in the auxiliary plate 31 to receive the butt ends of the pintle pins of the bracket so as to permit the auxiliary plate and bracket plate portions 24a and 25a to be drawn up into snug mutual engagement. These holes and their fit with the pintle pin butt ends also cooperate with the screw connections shown just above them in Fig. 4 so that the connection of the two parts of the modified structure is made doubly secure.

The tripod table may be provided with any suitable type of stud and lock nut device 33 for mounting the camera or other instrument centrally or marginally of the table.

The invention may be embodied in variously modified forms, all within the scope of the appended claims, and numerous refinements of detail may be incorporated in the structure. Thus, for example, the extreme upper end portion of each stick element may be bound by a sheet metal strip or enclosed in a ferrule appropriately perforated to provide a metal journal for the cooperating pintle pin. In construing the claims, I regard the combination of main and auxiliary plates, shown in Figs. 4 and 5, as within the scope of the term "bracket plate" or equivalent expression, so that the two-plate form of the invention and the single-plate form are species of the same generic concept.

I claim:
1. In a tripod construction of the type comprising a table, a set of legs each of which includes a pair of stick elements, and means mounting the table on the legs comprising a plurality of brackets depending from the table and spaced from each other, each bracket including an upper ear secured to the under side of the table, a plate depending from said ear and comprising two angularly related portions, and a pin projecting from each portion so that the two pins of each plate extend divergently and each is aligned with a pin which projects from the plate of the next adjacent bracket, the stick elements of each leg being pivotally mounted on such two aligned pins, the combination with said plate portions of an ear projecting from the free edge of each plate portion, each ear providing a substantial area for engaging the adjacent stick element and limiting the spread of the legs.

2. In a tripod construction of the type comprising a table, a set of legs each of which includes a pair of stick elements, and means mounting the table on the legs comprising a plurality of brackets depending from the table and spaced from each other, each bracket including an upper ear secured to the under side of the table, a plate depending from said ear and comprising two angularly related portions, and a pin projecting from each portion so that the two pins of each plate extend divergently and each is aligned with a pin which projects from the plate of the next adjacent bracket, the stick elements of each leg being pivotally mounted on such two aligned pins, the combination with each plate portion of an ear projecting right angularly therefrom along a downward and outward slope to provide flat stop surfaces of substantial area for the stick elements to limit the spread of the legs.

3. In a tripod construction of the type comprising a table, a set of legs each of which includes a pair of stick elements, and means mounting the table on the legs comprising a plurality of brackets depending from the table and spaced from each other, each bracket including an upper ear secured to the under side of the table, a plate depending from said ear and comprising two angularly related portions, and a pin projecting from each portion so that the two pins of each plate extend divergently and each is aligned with a pin which projects from the plate of the next adjacent bracket, the stick elements of each leg being pivotally mounted on such two aligned pins, the combination with each plate portion of an auxiliary plate fastened thereto in parallel abutting relation therewith and having an ear projecting right angularly from its outer edge along a downward and outward slope to provide a flat stop surface of substantial area for a stick element to limit the spread of the leg including said stick element.

4. In a tripod construction of the type comprising a table, a set of legs each of which includes a pair of stick elements, and means mounting the table on the legs comprising a plurality of brackets depending from the table and spaced from each other, each bracket including an upper ear secured to the under side of the table, a plate depending from said ear and comprising two angularly related portions, and a pin projecting from each portion so that the two pins of each plate extend divergently and each is aligned with a pin which projects from the plate of the next adjacent bracket, the stick elements of each leg being pivotally mounted on such two aligned pins, the combination with said plate portions of auxiliary plates fastened thereto in parallel abutting relation therewith and having ears projecting right angularly from the free edges of each auxiliary plate, each ear providing a substantial area for engaging the adjacent stick element and limiting the spread of the legs.

BERNARD J. FOY.